United States Patent [19]
Noble et al.

[11] Patent Number: 6,003,878
[45] Date of Patent: Dec. 21, 1999

[54] T-JOINT GASKET ASSEMBLY

[75] Inventors: Lane Noble, Novi, Mich.; Thomas Boardman, Gilford, N.H.

[73] Assignee: Freudenberg-NOK General Partnership, Plymouth, Mich.

[21] Appl. No.: 08/944,447

[22] Filed: Oct. 6, 1997

[51] Int. Cl.[6] .................................................. F16J 15/12
[52] U.S. Cl. ......................... 277/596; 277/591; 277/598
[58] Field of Search .................................... 277/598, 596, 277/594, 591

[56] References Cited

U.S. PATENT DOCUMENTS

| | | |
|---|---|---|
| 4,118,041 | 10/1978 | Futamura . |
| 4,468,044 | 8/1984 | Ulmer et al. ............................. 277/596 |
| 4,535,996 | 8/1985 | Cardis et al. . |
| 4,630,835 | 12/1986 | Locacius .................................. 277/594 |
| 4,832,349 | 5/1989 | Kawai et al. . |
| 5,222,745 | 6/1993 | Akbar et al. . |
| 5,267,740 | 12/1993 | Stritzke ................................... 277/596 |
| 5,511,518 | 4/1996 | Jain et al. . |
| 5,673,920 | 10/1997 | Mockenhaupt ...................... 277/598 X |

*Primary Examiner*—Anthony Knight
*Attorney, Agent, or Firm*—Dinnin & Dunn, P.C.

[57] ABSTRACT

A gasket assembly for use in an automotive engine for sealing a T-joint or multi-joint assembly without the use of a secondary sealing media such as RTV. The gasket assembly including a first gasket having a core member, having a plurality of orifices. A seal member attached to the side of the core member. At least one sealing bead extending from an end of the seal member, at least one of the sealing beads engaging with a sealing pad attached to a second gasket to form a T-joint between an engine block, an oil pan and front cover.

20 Claims, 3 Drawing Sheets

T-JOINT GASKET ASSEMBLY

BACKGROUND OF THE INVENTION

1. Field of the Invention

The present invention relates to gaskets and gasket sealing mechanisms, and in particular, to an improved T-joint gasket assembly which does not use RTV sealant. RTV means room temperature vulcanizing sealant or agent.

2. Description of Related Art

Gaskets are used to provide a leak proof seal between two engine parts or other devices. Typically, the parts being sealed include flat sealing surfaces which are adjacent to one another during use. The gasket is usually placed between the opposite surfaces of the two components and compressed between them to prevent the escape of a gas, fluid or other medium. Many different variations and structures have been used in the prior art for gaskets and their sealing arrangements.

A particular problem has arisen in prior art seals which are used at a T-joint. A T-joint occurs at the intersection of three sealing surfaces. Such a T-joint may be found between a front cover, an oil pan and an engine block in an automotive engine. Many of the prior art attempts at providing a seal for such a T-joint have either used a sealant or caulking medium such as a RTV sealant or have used key and hole arrangements having flat surfaces in an attempt to provide a leak proof seal environment.

Both of the above prior art attempts at sealing a T-joint have not been successful in terms of costs and problems with application. First the sealing or caulking medium that is used such as a RTV sealant is very costly, messy and difficult to service. RTV sealant has also been known to effect the seal environment by over filling the adjacent trench in which the gasket sits thus providing a gap where fluid and/or gas may leak around the seal. Another problem is that the RTV sealant used in such seals hardens over time and cracks thus creating a leak around the sealing element.

The other type of seal arrangement is the key and hole which has flat surfaces that are prone to failure because of the relatively small amount of shift allowed in the mating components. This results in less than desirable interlocking and insufficient seal between the T-joint elements.

Therefore, there is a need in the art for a T-joint seal that is easy to install, relatively inexpensive and prone to last longer than the RTV sealant based seals.

SUMMARY OF THE INVENTION

One object of the present invention is to provide a RTV-less seal for a T-joint assembly.

Another object of the present invention is to provide a seal assembly that limits the need for a secondary sealant at multiple joint interfaces.

Yet a further object of the present invention is to provide a seal element that eliminates the need for an engine assembly line purge due to the hardening effect of RTV sealants.

A further object of the present invention is to provide a seal assembly that enables reusability of gaskets in service.

Yet another object of the present invention is to provide a seal assembly that reduces the cost and improves the cleanliness of the engine assembly process.

To achieve the foregoing objectives the present invention of a gasket assembly includes a core member having a plurality of orifices, and a seal member attached to a side or fully encompassing of the core member. At least one sealing bead extending from an end of the seal member, the seal bead engaging with a sealing pad surface at a T-joint between an oil pan, front cover and an engine block.

One advantage of the present invention is that it will eliminate the need for secondary sealant in multiple joint interfaces.

A further advantage of the present invention is that it eliminates the need for engine assembly line purges due to the hardening effect of RTV sealants.

Yet a further advantage of the present invention is that it enables the reusability of gaskets while in service.

A further advantage of the present invention is that it reduce costs and improves the cleanliness of the engine assembly process.

Other objects, features and advantages of the present invention will become apparent from the subsequent description and appended claims, taken in conjunction with the accompanying drawings.

Figure 1:
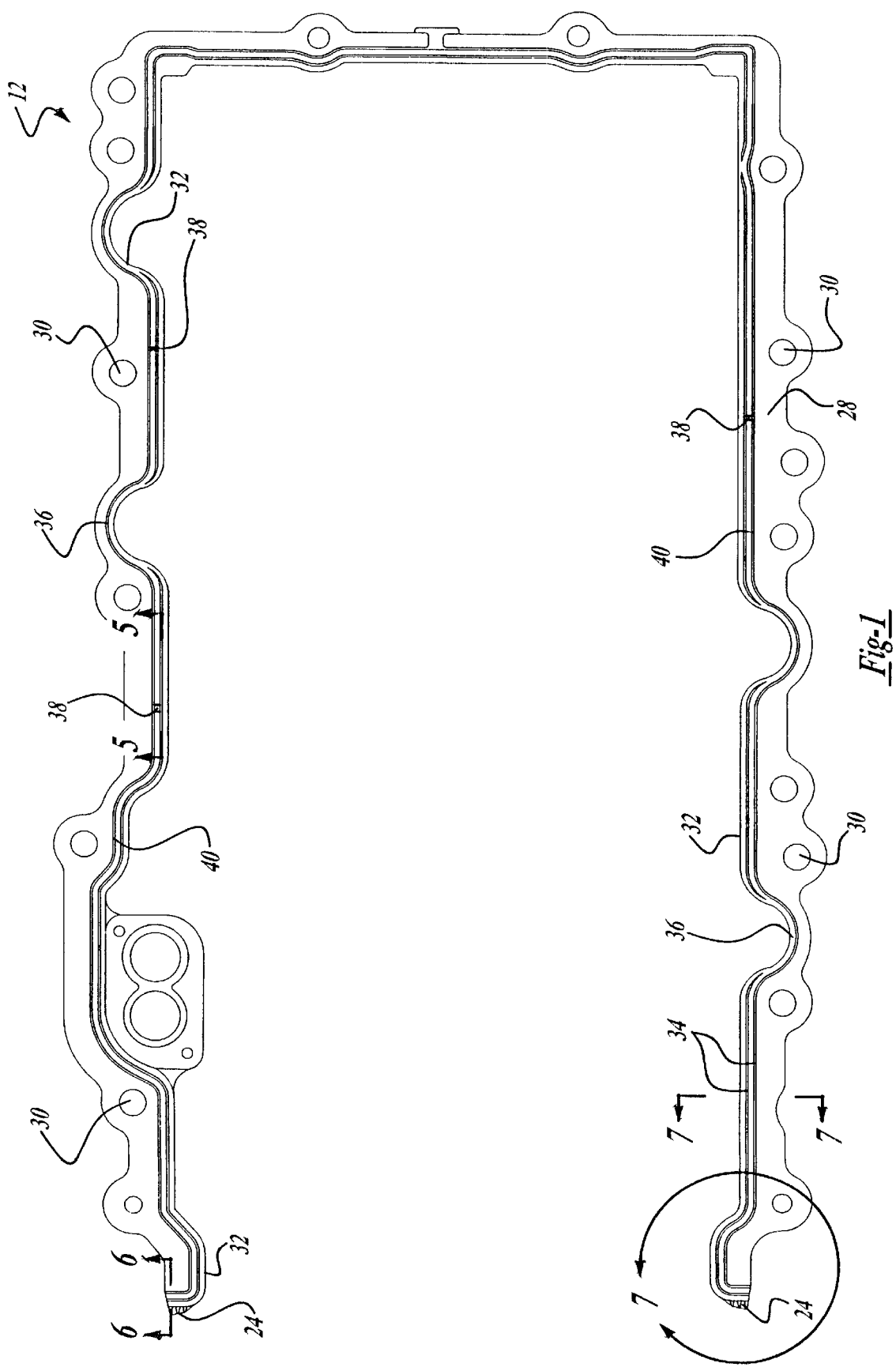
FIG. 1 shows a plan view of the present invention.

BEST MODE IN CARRYING OUT THE INVENTION AND DESCRIPTION OF THE PREFERRED EMBODIMENTS

Referring to the drawings, a gasket assembly 10 for use in a T-joint or multiple joint interface is shown. The gasket assembly 10 includes a first gasket 12 which generally has a U-shaped design. However, it should be noted that other shapes can be used depending on the need and the multiple joint interface to be sealed. The first gasket 12 is used to seal between a first 14 and second sealing surface 16. The first 14 and second sealing surface 16 can be the oil pan and engine block but may be other components found in the automotive engine. The first gasket 12 interacts and mates with a second gasket 18 to form a gasket assembly 10. The second gasket 18 is placed between a third sealing surface 20 such as a front cover and the above mentioned engine block and oil pan. A three surface interface such as described above that need sealing have also been known as T-joints. A T-joint seal in the T-joint will prevent leakage of a liquid or gas from the three surface interface.

Figure 9:
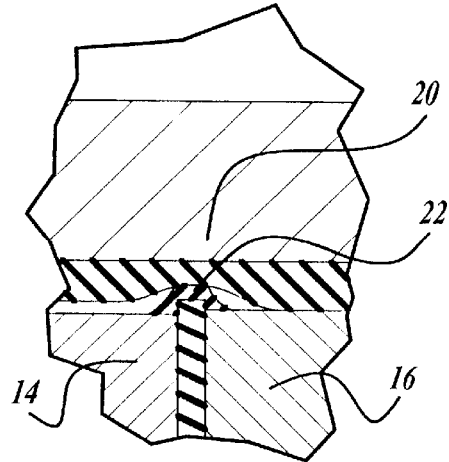
FIG. 9 shows a prior art RTV seal joint.

The gasket assembly 10 of the present invention is a RTV-less gasket assembly. Prior art seals have used a RTV sealant 22 to provide a seal at the multiple joint interface as shown in FIG. 9. But the prior art seal experienced problems in that the RTV sealant 22 if not applied precisely could potentially interfere with the function of the gasket. Additionally, if the RTV was left applied to the T-joint during an assembly line shutdown then the hardening of the RTV would not perform its function and would tend to harden and become brittle over time in the automotive engine environment. This hardening and brittleness of the RTV causes uneven sealing surfaces thus creating a leaking environment within the T-joint.

The present invention involves a RTV-less gasket with a sealing bead 24 which will interact and mate with a sealing pad 26 from the second gasket 18 to create a leak free seal at the T-joint interface. It should be noted the sealing pad 26 is preferably made of an elastomer material but any other type of resilient material such as rubber, soft plastic, or any other soft material may be used. The first gasket 12 is shown in FIG. 1 and includes a core member 28 having a plurality of orifices 30 for use in aligning and securing the first gasket 12 between the first 14 and second sealing surfaces 16. In the preferred embodiment the core member 28 is made of a metal material but it should be noted that any type of hard ceramic, plastic material or any other type of metal may be used.

One of the sealing member 32 generally has a U-shaped design along the plane of sealing and is connected to the inside surface of the core member 28. The sealing member 32 is preferably made of an elastomer material but any other type of resilient rubber, ceramic or plastic material may be used as the sealing member. The sealing member 32 typically includes a dual sealing ridge or rib 34 around its entire periphery. The sealing ridge 34 at times converges into a single sealing ridge 36 but still provides for at least one sealing ridge around the entire upper and lower surface of the sealing member 32. The sealing ridge 34 is used to create the seal between the first 14 and second surfaces 16 such as the engine block and oil pan. Between the pair of sealing ridges 34 located on the top and bottom surfaces of the sealing member 32 are a spacer or separator member 38 which insures that the sealing ridges maintain a degree of separation from each other thus creating a better sealing surface and seal between the first 14 and second sealing surfaces 16. A plurality of the separator members 38 occur at regular intervals between the sealing ridges 34 on the sealing member 32. The sealing member 32 is preferably directly molded on the core members inner surface 40 but it should be noted other methods such as direct bonding or any other type of securing method can be used. The sealing ridges 34 found on the sealing members top and bottom surfaces extend beyond the flat side surfaces of the core member 28, insuring that the sealing member 32 provides the necessary seal and that the core member 28 provides stability and proper alignment of the gasket between the sealing surfaces (14, 16).

Figure 8:
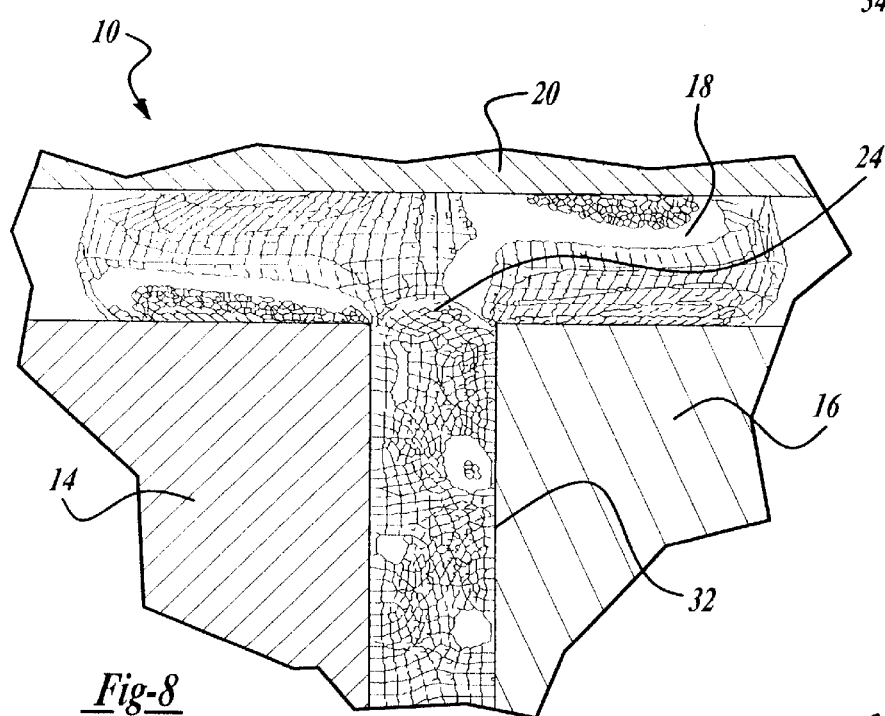
FIG. 8 shows the T-joint seal after compression.

A plurality of special sealing beads 24 (see FIGS. 1, 2, 3) extend from each end of the seal member 32. The sealing ridges 34 gradually end at the sealing beads 24. In a preferred embodiment, three sealing beads 24 extend outwardly from the seal member 32 (FIG. 3). Each of the sealing beads 24 extend a predetermined distance longitudinally from the sealing member 32. The height or distance can range from 5 millimeters down to 0.25 millimeters, but in the preferred embodiment the height ranges from 3 millimeters to 1 millimeter. After the first gasket member 12 is installed between the first and second sealing surfaces (14, 16) and as the sealing member 32 sealingly engages the first and second sealing surfaces (14, 16), the dual ridges 34 flow or deform to the thickness of the core member 28. Because the elastomer is incompressible (i.e., it can be displaced or deformed, but it is not compressible); the sealing beads 24 extrude toward the second gasket on the third surface 20 of the second sealing joint. At least one of the plurality of sealing beads 24 extends or extrudes from the sealing member 32 in order to sealingly engage the seal pad 26 of the second gasket 18 as shown in FIGS. 2 and 8.

Figure 2:
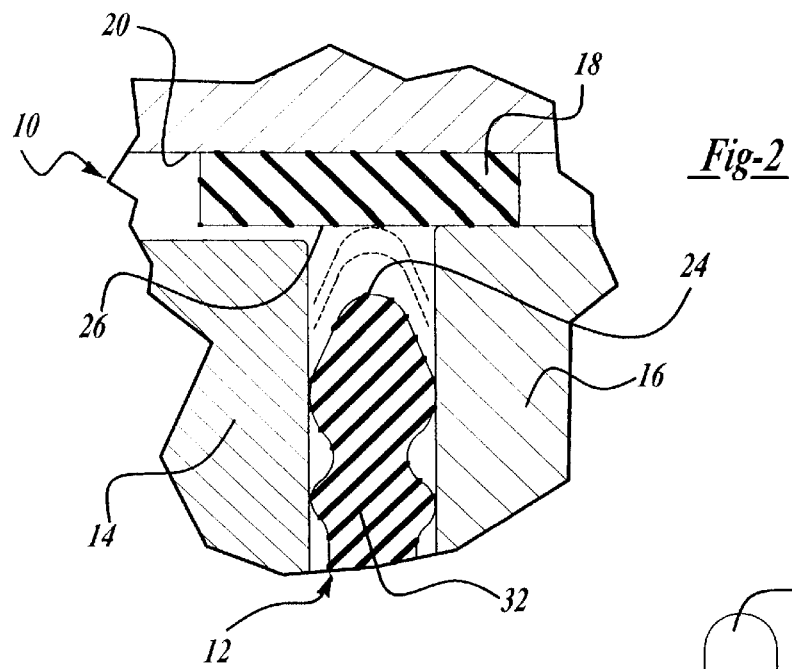
FIG. 2 shows a cross section of a T-joint interface with the present invention.
Figure 3:
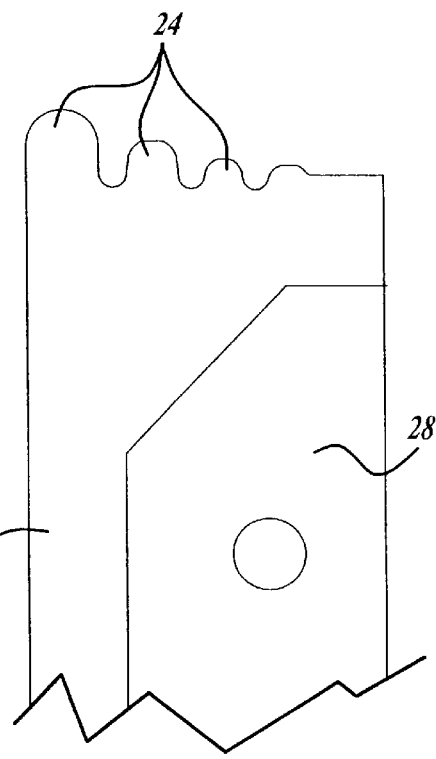
FIG. 3 shows the sealing beads at the end of the seal member.
Figure 4:
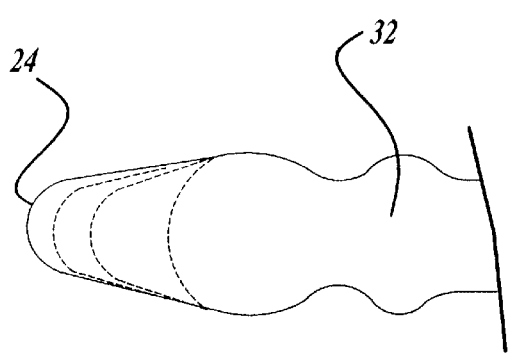
FIG. 4 shows a side view of the sealing beads.
Figure 5:
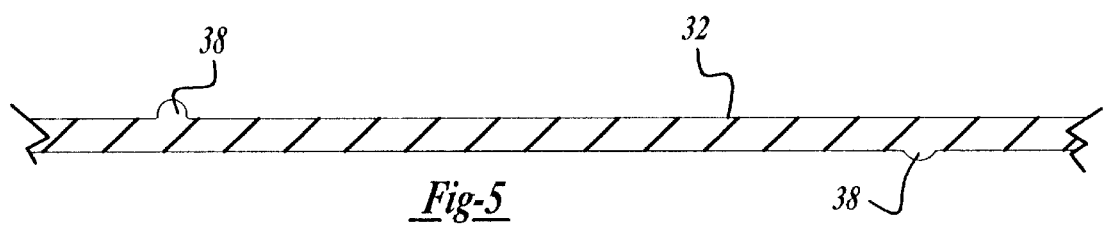
FIG. 5 shows a cross section of the sealing member.
Figure 6:
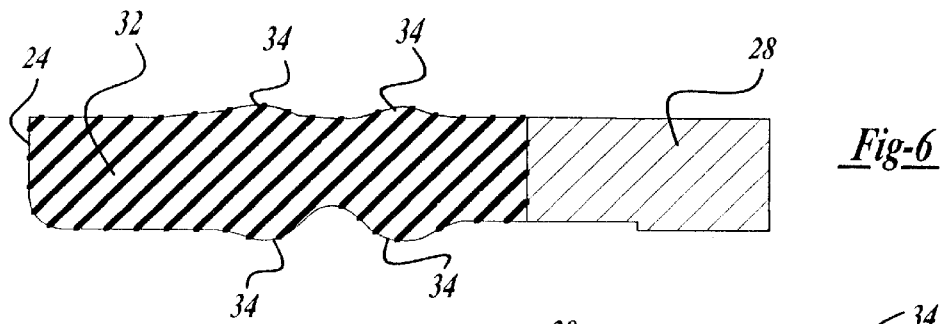
FIG. 6 shows a cross section of the first gasket.
Figure 7:
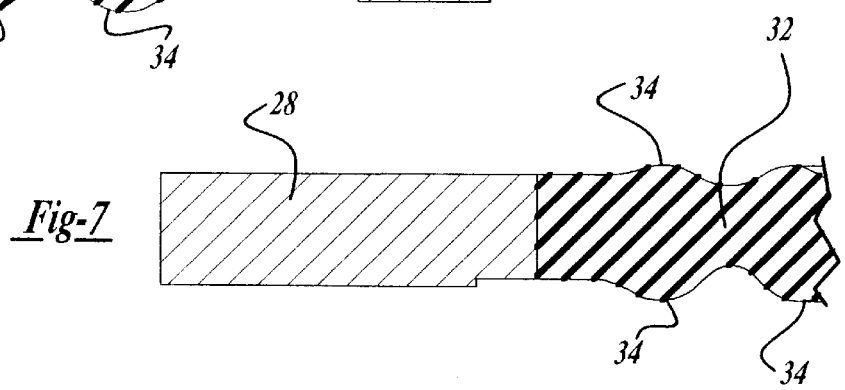
FIG. 7 shows a cross section of the first gasket.

A second gasket 18 is used in the gasket assembly 10 and is placed between a third sealing surface 20 and the combined first and second sealing surface (14, 16) which meet at a T-joint or multi-joint interface (see FIG. 2). The third sealing surface 20 usually is found on a front cover of an automotive engine. At least one of the sealing beads 24 protrudes from the first sealing joint and interengages with a sealing pad 26 of the second gasket 18 which is found between the third sealing surface and the combined first and second sealing joint. The resilient sealing beads 24 will create a leak free seal with the sealing pad 26 of the second gasket 18 thus providing a RTV-less T-joint seal. If all three of the sealing beads 24 protrude from the first sealing joint then all three will interengage and create a leak free seal with the seal pad 26 of the second gasket 18, it should be noted that only one sealing bead 24 needs to interact and interengage with the sealing pad 26 of the second gasket 18 to create a leak free T-joint seal. It should be noted that the preferred embodiment uses three sealing beads 24 but a different plurality of sealing beads 24 may be used depending on the operating environment of the automotive engine being used. The sealing beads heights vary from one and another but are at least equal to the total tolerances allowed for between the third sealing surface 26 and the first joint surface (14, 16).

In the preferred embodiment the first sealing joint provides a near flush condition for the second sealing joint at the intersection of the T-joint. The near flush condition would provide a single plane for the T-joint seal without the use of liquid sealants. Thus the first sealing joint in the preferred embodiment creates a flat surface with only the sealing beads 24 extending or creating any uneven surface along the first sealing joint. This prevents and eliminates the use of any RTV sealant and thus further reduces the cost of manufacturing and replacing seals that are used in T-joint sealing interfaces.

The present invention has been described in an illustrative manner, it is to be understood that the terminology which has been used is intended to be in the nature of words of description rather than limitation. Many modifications and variations of the present invention are possible in light of the above teachings.

Therefore, within the scope of the appended claims, the present invention may be practiced otherwise then as specifically described.

What is claimed is:

1. A gasket assembly for sealing a first surface, a second surface adjacent to the first and a third surface intersecting the first and second surface, said first, second and third surfaces forming a T-joint, said T-joint being sealed absent another sealant, said gasket assembly comprising:

a core member having an exterior edge;

a seal member attached to said exterior edge, said seal member having at least one surface, at least one sealing bead on said at least one surface adjacent to said exterior edge and an edge portion extending from said at least one sealing bead whereby when said seal member sealingly contacts the first and second surfaces, said edge portion moves to contact the third surface and seal the T-joint absent the use of another sealant.

2. The gasket as claimed in claim 1 wherein said seal member is an elastomer material.

3. The gasket as claimed in claim 1 wherein said at least one surface having a top and bottom surface and wherein said at least one sealing bead is on said top surface and at least another sealing bead is on said bottom surface.

4. A gasket assembly as claimed in claim 3 wherein when said at least one sealing bead contacts the first surface and at least another sealing bead contacts the second surface, said sealing beads are compressed and the end of said edge portion extrudes to contact the third surface.

5. A gasket assembly as claimed in claim 4 wherein said edge portion having at least one edge bead sealingly contacting the third surface.

6. A gasket assembly as claimed in claim 5 wherein said edge bead having three edge beads.

7. A gasket assembly as claimed in claim 6 wherein said three edge beads are spaced apart from each other.

8. A gasket assembly as claimed in claim 6 wherein each of said three edge beads extend toward the third surface at different lengths from each other.

9. The gasket of claim 1 wherein said sealing bead protrudes from an end of said seal member a predetermined distance.

10. The gasket is claimed in claim 1 wherein said seal member has at least two beads and a plurality of sealing ribs connecting said at least two beads.

11. A gasket assembly for sealing a first and second surface in spaced relation to said first surface and a third surface intersecting the first and second surfaces, said first, second and third surfaces forming a T-joint, said gasket assembly comprising:
    a first gasket having a core member, said first gasket mounted between the first and second surfaces;
    a seal member connected to the periphery of said core member, said seal member having at least one sealing ridge on the top and bottom surfaces of said core member; and
    at least one sealing edge located on the end of said core member, said at least one edge having at least two sealing beads, said sealing beads having predetermined heights that vary from one another, said at least two sealing beads extend toward the third surface so that at least one of said at least two sealing beads interengages with the third surface to provide a leak-free seal at the T-Joint.

12. The gasket assembly as claimed in claim 11 wherein when said at least one sealing ridge on the top and bottom surfaces of said core member sealingly contacts the first and second surfaces, said at least one sealing edge extrudes from the end of said core member to sealingly contact the third surface.

13. The gasket assembly of claim 11 wherein said seal member is made of an elastomer.

14. The gasket assembly as claimed in claim 11 wherein said at least two sealing beads are four sealing beads.

15. The gasket assembly as claimed in claim 14 wherein each of said four sealing beads vary in distance from the end of said core member from one another.

16. A gasket assembly for sealing first, second, and third surfaces, said first, second and third surfaces forming a T-joint, said gasket assembly comprising:
    a first gasket having a core member;
    a seal member connected to the exterior edge of said core member, said seal member having a sealing ridge adjacent to the top and bottom surface of said core member; and
    three sealing beads contiguous to said seal member and extending from the end of said first gasket, the first of said three sealing beads having a first predetermined height, the second of said three sealing beads having a second predetermined height greater than said first predetermined height, the third of said three sealing beads having a third predetermined height greater than said second predetermined height, wherein said three sealing beads extending from the end of said first gasket to interengage the third surface when the said sealing ridge sealingly engages the first and second surfaces to provide a leak free T-joint.

17. The gasket assembly of claim 16 wherein said seal member is an elastomer material.

18. The gasket assembly of claim 16 wherein said sealing beads are an elastomer material.

19. A gasket assembly as claimed in claim 16 wherein said core member comprises a material selected from the group consisting of plastic, aluminum, metal or ceramic.

20. The gasket assembly as claimed in claim 16 wherein said sealing ridge is a pair of adjacent sealing beads.

\* \* \* \* \*

UNITED STATES PATENT AND TRADEMARK OFFICE
CERTIFICATE OF CORRECTION

PATENT NO.    : 6,003,878
DATED         : December 21, 1999
INVENTOR(S)   : Noble et al.

It is certified that error appears in the above-identified patent and that said Letters Patent is hereby corrected as shown below:

Column 4,
Line 25, please delete the words "joint surface" and insert therefor -- and second sealing surfaces --

Signed and Sealed this

Twentieth Day of May, 2003

JAMES E. ROGAN
*Director of the United States Patent and Trademark Office*